Aug. 8, 1939.  S. LOEWENBUCK  2,168,824
TYPEWRITER WITH TYPE WHEEL AND NORMAL KEYBOARD
Filed Sept. 12, 1936  11 Sheets-Sheet 7
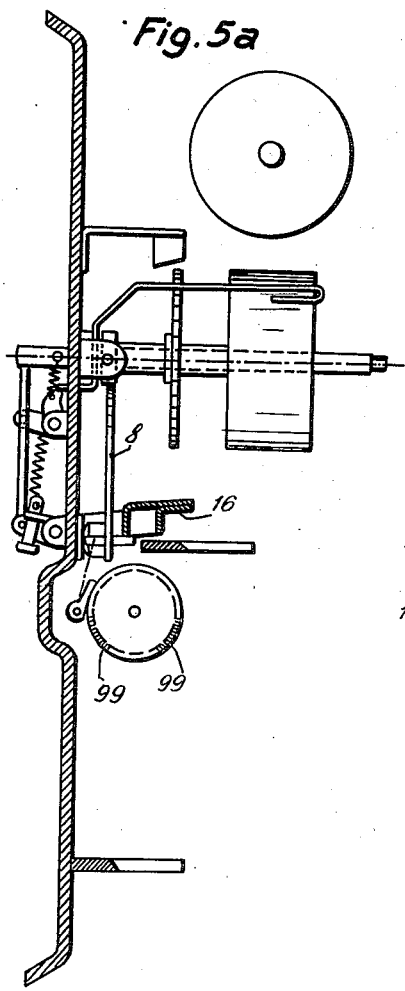
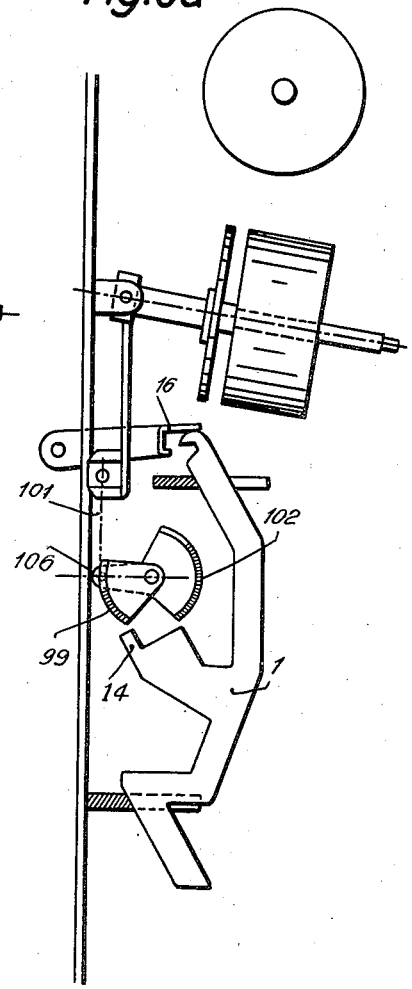
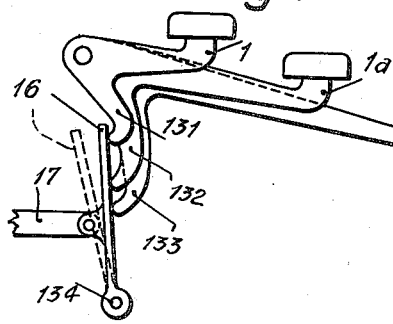
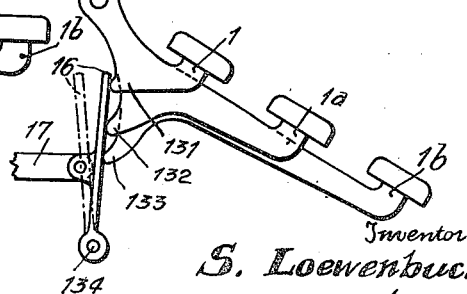

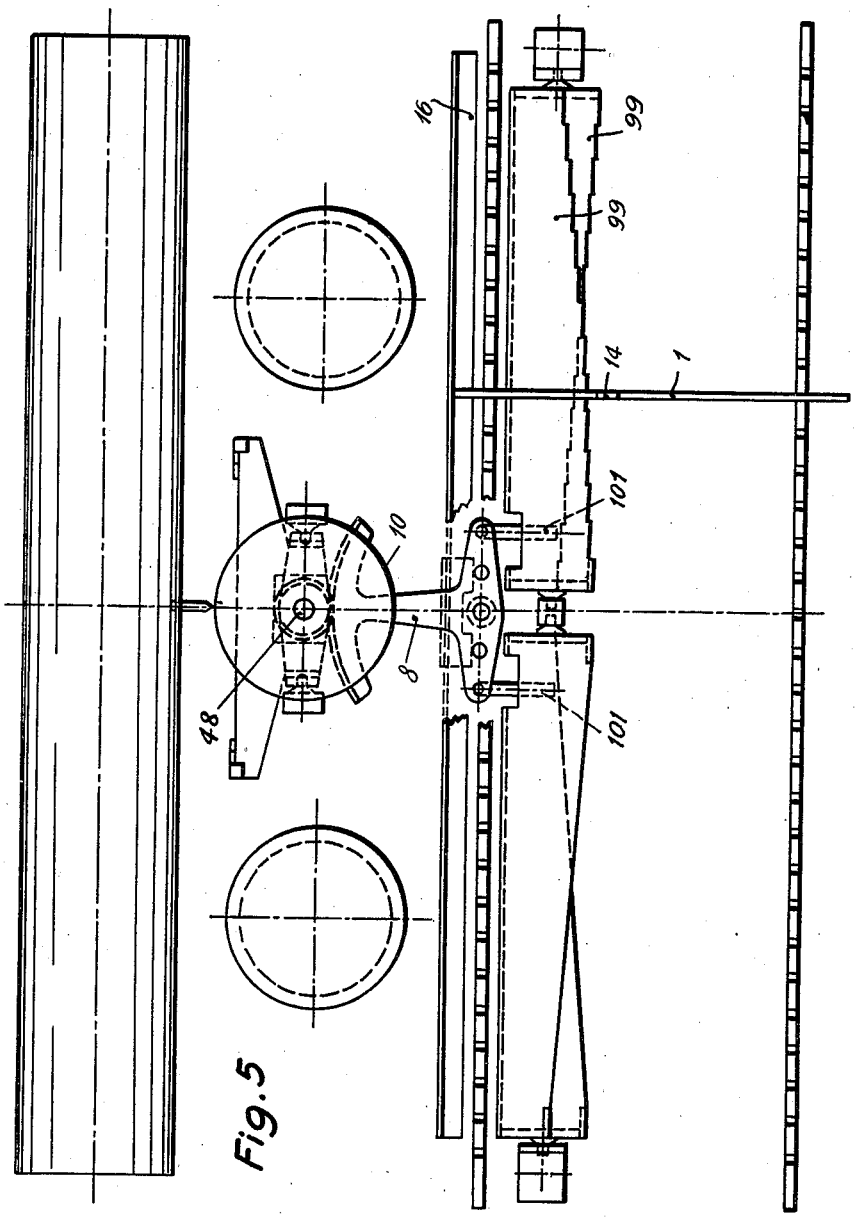

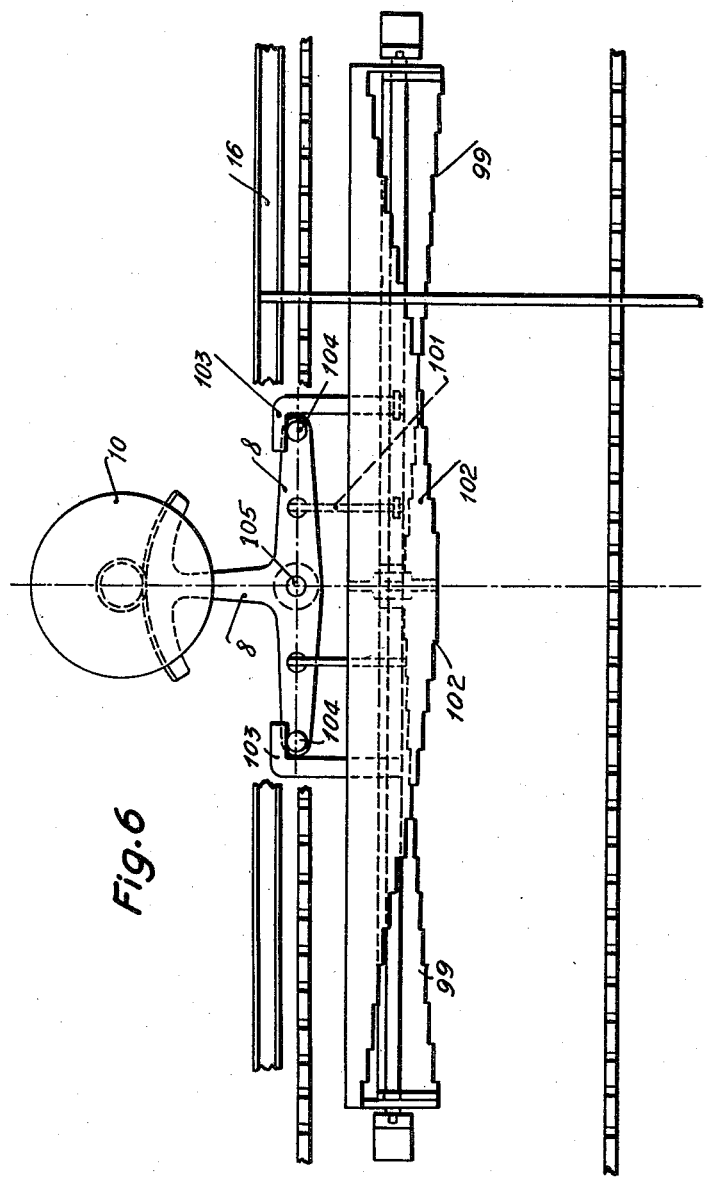

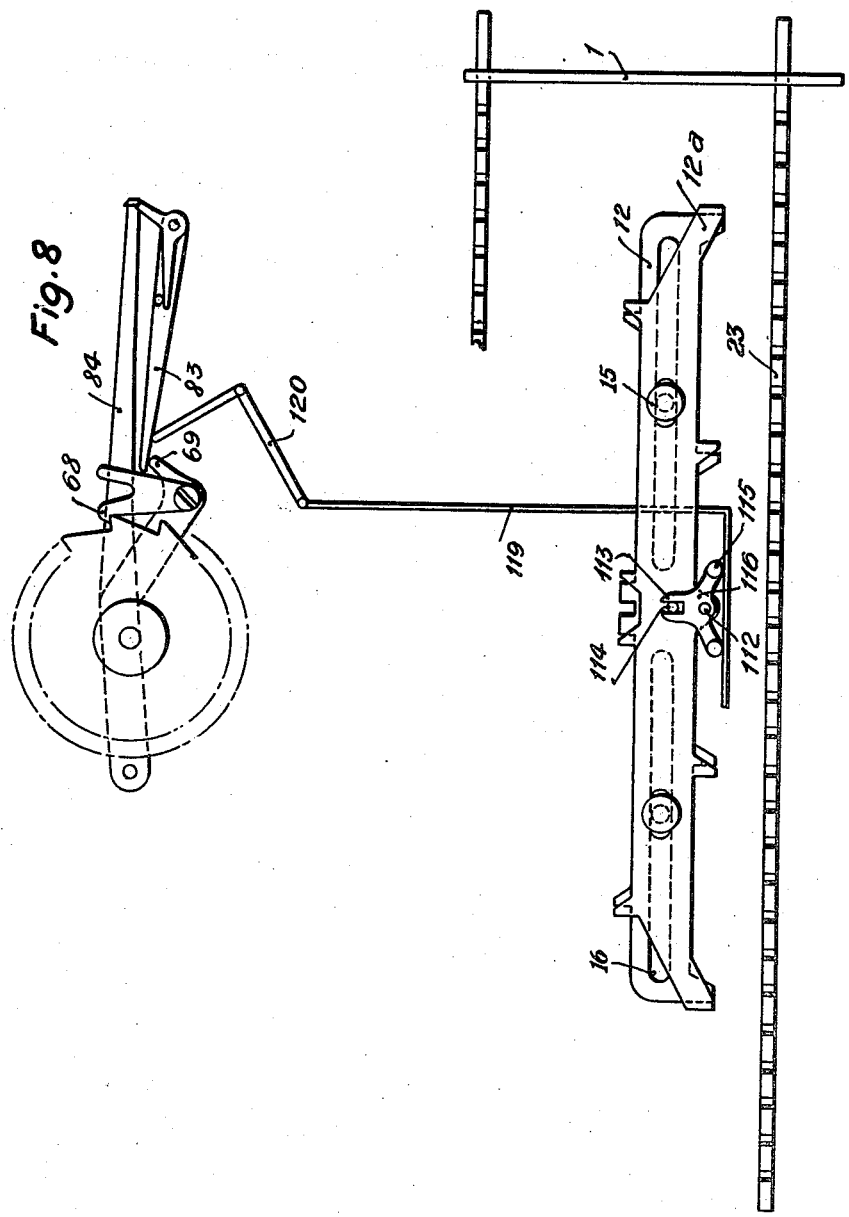

Aug. 8, 1939.  S. LOEWENBUCK  2,168,824
TYPEWRITER WITH TYPE WHEEL AND NORMAL KEYBOARD
Filed Sept. 12, 1936   11 Sheets-Sheet 10
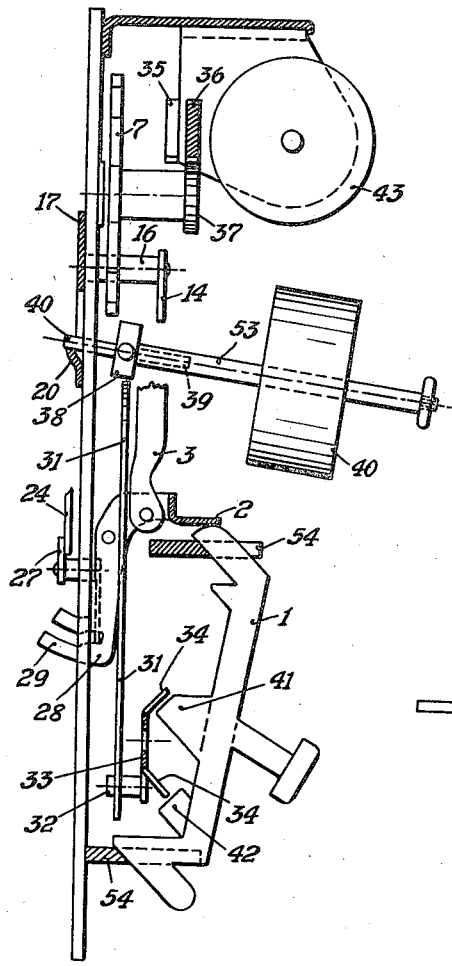
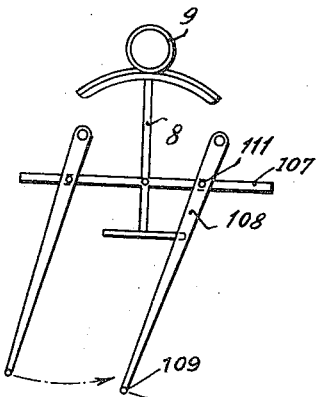
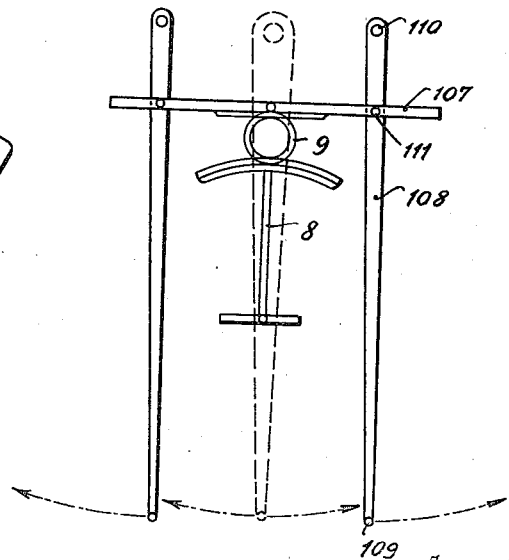
Inventor
S. Loewenbuck
By Ferd. Nuch
Attorney

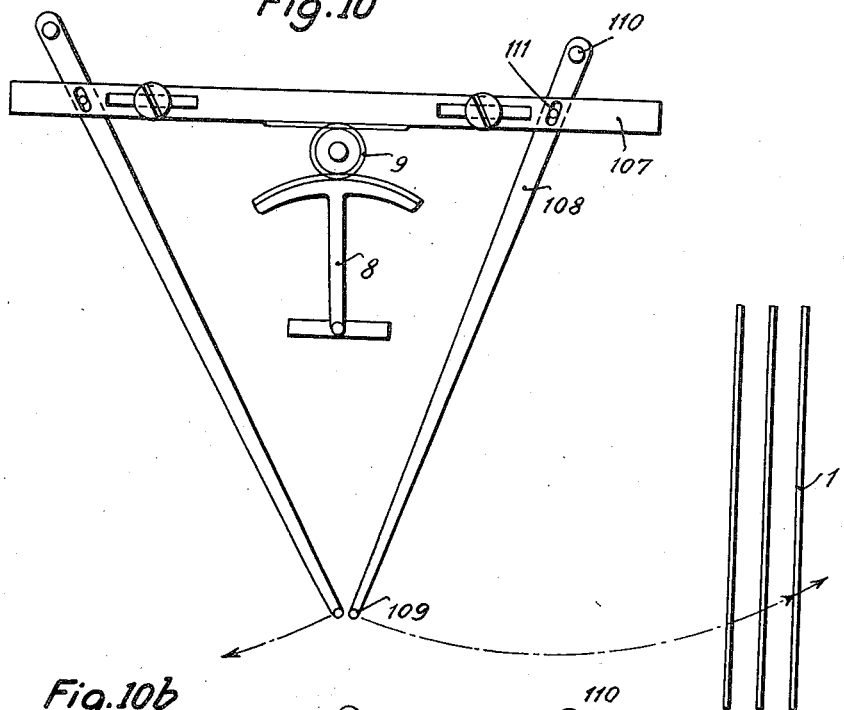
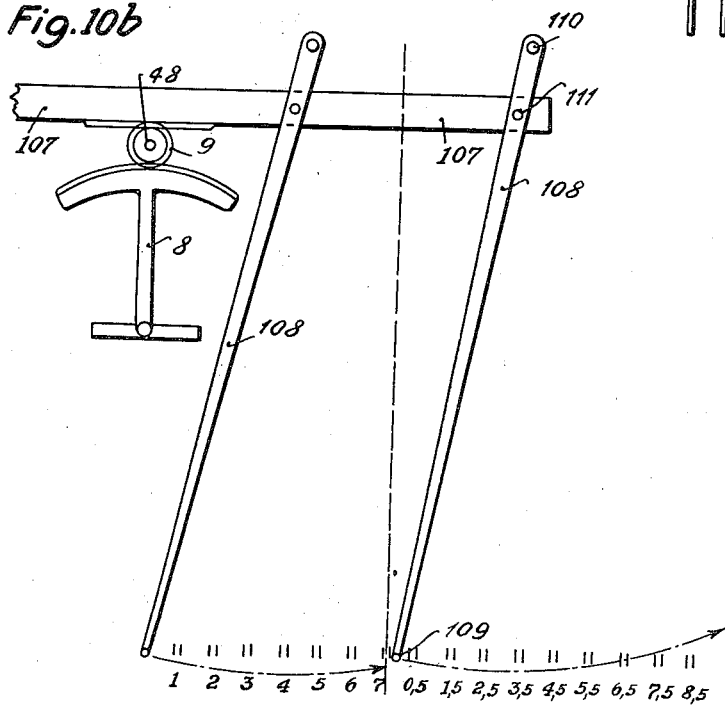

Patented Aug. 8, 1939

2,168,824

UNITED STATES PATENT OFFICE 2,168,824

TYPEWRITER WITH TYPE WHEEL AND NORMAL KEYBOARD

Sebastian Loewenbuck, Zurich, Switzerland

Application September 12, 1936, Serial No. 100,578
In Switzerland September 14, 1935

5 Claims. (Cl. 197—55)

The present invention relates to a typewriter with type wheel and keyboard. The novelty of the invention resides in the fact, that the rotation and the return of the type wheel, as well as the stroke of same take place automatically by means of the tension of a spring, which on its part is brought about by the carriage spring. The winding of the spring, however, may be effected also by pressing down the keys. This novelty affords the possibility of building a typewriter with type wheel, that permits of acquiring a high writing-velocity, when the keys are operated with a light and short touch.

In addition to these main characteristics the machine shows a number of further innovations, which appear in the drawings, more particularly that the stroke of the type wheel is performed as the keys come back, and that the spring causes the type wheel to strike first and after completion of the stroke through further releasing, effects its return to normal position.

A further innovation of the machine is the driving arrangement by means of push keys, and the peculiar manner of arresting the type wheel by means of a comb, that moves to and fro underneath the keys, and is of special new shape inasmuch as the number of its teeth is less than the number of key pins against which it comes to strike.

With the above and other objects in view that will become apparent as the nature of the invention is better understood, the same consists in the novel form, combination and arrangement of parts hereinafter more fully described, shown in the accompanying drawings and claimed.

In the drawings:

Figure 1a is an end elevational view partly in section of the mechanism shown in Figure 1;

Figure 2a is a diagrammatic top plan of the type wheel and support therefor;

Figure 3a is an end elevational view, partly in section of the mechanism shown in Figure 3;

Figure 5 is a fragmentary top plan view of another form of type wheel typewriter construction;

Figure 5a is an end elevational view partly in section of the mechanism shown in Figure 5;

Figure 6 is a fragmentary top plan view of another form of type wheel typewriter construction;

Figure 6a is a fragmentary top plan view of another form of type wheel typewriter construction;

Figures 7 and 7a are end views respectively of different types of banks of key pins;

Figure 8 is a fragmentary plan view of another form of operating mechanism;

Figures 10, 10a, 10b and 10c diagrammatically illustrate the principles of operation of the foregoing types of machines.

Figure 1:
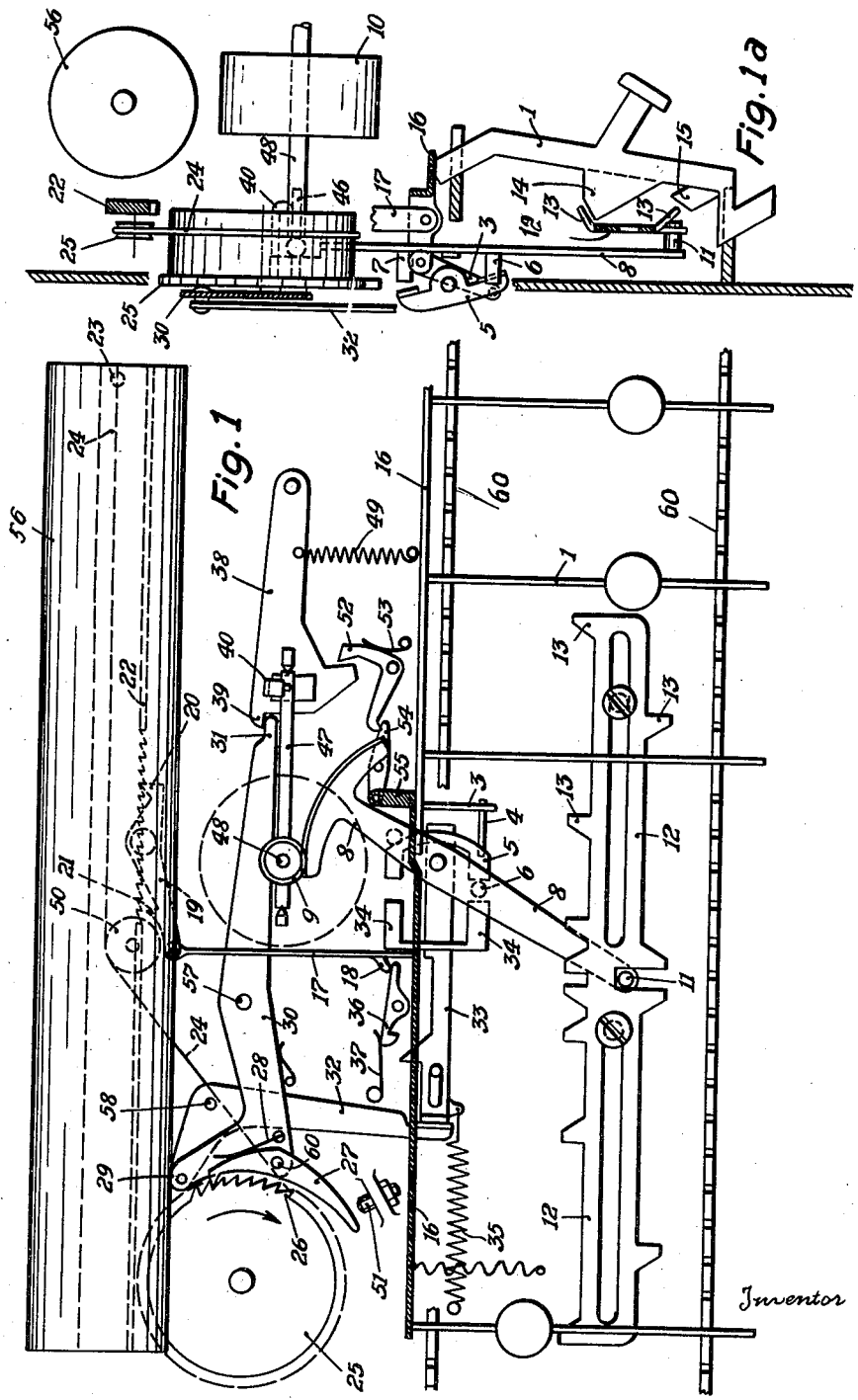
Figure 1 is a fragmentary top plan view, partly in section of a typewriter constructed in accordance with the present invention.

The accompanying drawings, Figure 1, show a form of construction of the invented typewriter. By striking a key, the key pin 1, which is supported in the slots of the guiding combs 60, is displaced forwardly at a certain angle whereby the butt-end 14 of the key pin descends and passes into the path of the oscillating comb 12. The displaced key causes the tipping of the part 16, which is turnably mounted. A connecting piece 17 is pivotally connected to the part 16 and moves in a forward direction as the part 16 is tilted, causing the rotation of the part 19 which, in known manner by means of two teeth 20 and 21 alternately engaging in the rack of the carriage, allows escapement of the carriage to the next following tooth. The carriage is pulled in known manner by means of a string 24 connected to a spring. The casing of the carriage spring 25 is provided with teeth 26. During each release of the spring the teeth of the casing cause part 27 to be pressed downwardly which, by means of its pin 60, moves the arm 30 about its axis 57, whereby the part 38 is moved upwardly, and the spring 49 is brought under tension. The tilting device 16, by means of a butt-end 55, simultaneously causes the part 54 to rotate, whereby the catch 52 is pushed underneath the part 38 and prevents the release of the spring 49. The teeth 26 of the spring casing 25, as it revolves, and as they press down the part 27 and the part 30, simultaneously cause the rotation of the part 32, which is supported at 58 and is carried along by the pin 29 of the part 30. The part 32 causes the displacement of the part 33, which is provided with the fork 34. The catch 36 snaps into the nose of the part 33, and prevents the release of the spring 35 which is connected with part 33. When the fork 34 is displaced it comes to strike against the pins 6 and 7 of the segment 8 and effects the rotation of the latter whereby the segment comes back to its initial position. The segment 8 meshes with the pinion 9 mounted on the axis of the type wheel 48, and also returns the type wheel to its normal position. The catch 27 is forced down by the teeth of the spring casing 25 until it rotates by striking against the pin 51 and disengages its nose from the teeth 26 of the spring casing. At that moment, a split spring 28 secures the reversing motion of the pin 60, whereby the arms 30 and 32 recover their rest position, and the catch 27 engages with its butt-end in the next following tooth of the spring casing 25.

Figure 2:
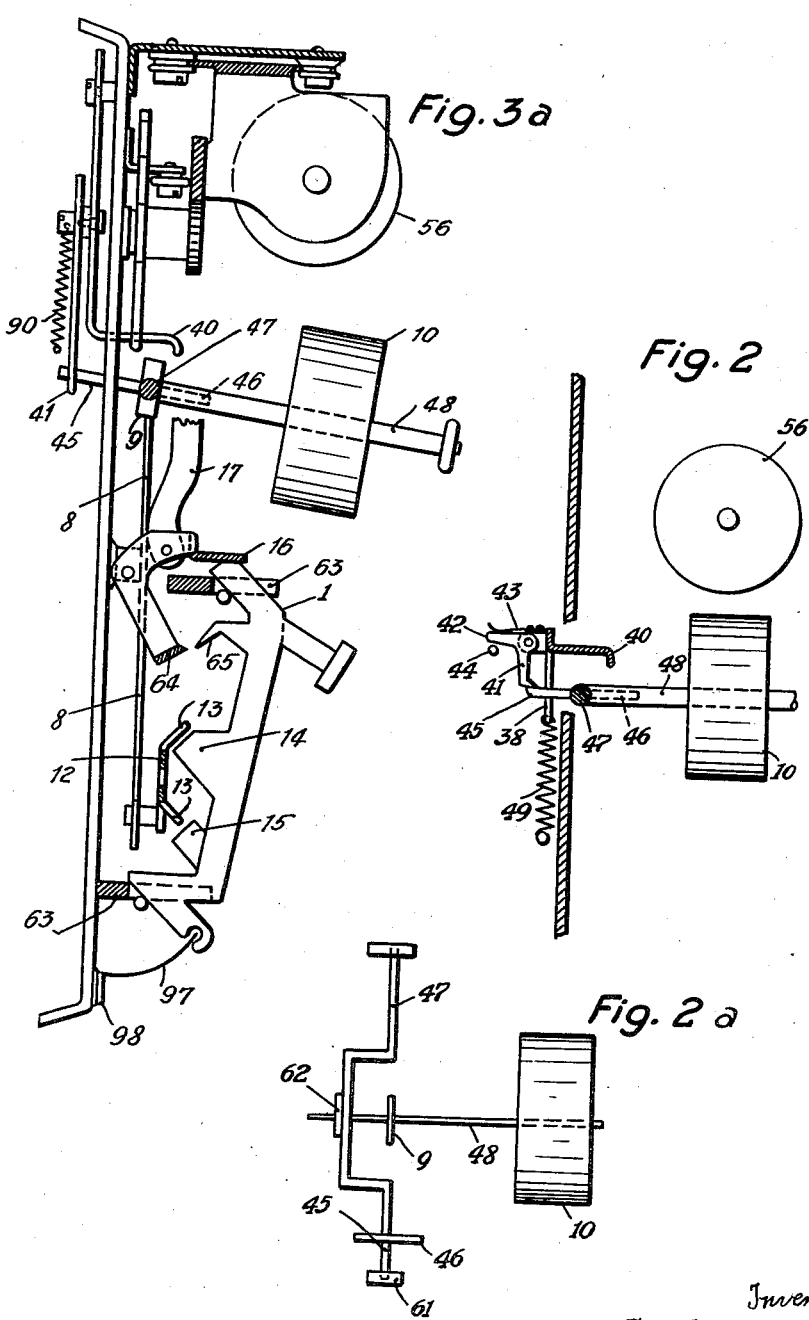
Figure 2 is a diagrammatic view, partly in section showing the relation between the platen and type wheel.

The axis 48, Fig. 2a, of the type wheel 10 is mounted at the point 62 on a rocking shaft 47. This shaft 47 is pivotally mounted in the guides 61. The pinion 9 which is mounted on the axis of the type wheel and engages with the segment 8 is mounted at a height on the axle 48 such as to be level with the bearing points 61. This arrangement affords the possibility that the pinion 9, in spite of the axis 48 of the type wheel being tilted, retains its contact with segment 8, and constantly and effectually engages in the teeth of the segment. The shaft 47 is provided with an upward pin 46 and a downward pin 45 as shown in Figure 2. The part 38 is provided with a butt-end 40 on its upper part, and a butt-end 41 on its lower part, the latter being shaped so as to form a movable catch. When the machine is at rest, the catch 41 bears against the pin 45.

After the stroke on the key has been effected, the key pin 1 is taken back to its initial position by the tilting device 16 and brought to its initial position. The tilting device 16 is divided into two equal parts, and consists of a right and a left half. The left half is provided with a spring, and may be pushed forwardly independently, whereas the right tilting device 16 always carries along with it the left half. The machine part 33 is equipped with a kind of tilting part 5 which alternately raises the one, or the other end, as the case may be, whether the right-hand one or the left-hand one of the tilting-devices 16 is set into motion by the key. The tilting part 5 thus gets into touch, now with the one, now with the other pin 6 and 7, of the segment 8. When the key pin 1 returns to its initial position, whereby the part 16 also moves back at the same time, the connecting element 17, by means of the butt-end 18, causes the catch 36 to rotate, whereby the part 33 is released. The spring 35 is then released, and causes part 33 to follow along, back to its initial position, whereby one of the pins 6 and 7, according to whether a key on the right hand or left hand part of the machine has been struck and according to which end of the tilting part 5 is in contact with these pins, is set into motion by the tilting part 5 and the segment 8 is rotated, to the right when the lower pin is set into motion and to the left when the upper one is set into motion. This rotation, however, only takes place until the comb 12, which is carried along by the segment 8 by means of its pins 11, strikes with one of its teeth against the key pin that happened to be struck. Every one of the teeth of the comb 12 is intended for a whole group of keys. The four teeth which are provided on each side of the comb on the right and left, when at rest are at different distances from the keys situated next to them, whereby is obtained that the comb, according to which one of the keys is struck, will make different movements. After the type wheel has been adjusted to a certain letter, the tilting device 16, during its further return movement, causes the part 54 to rotate backwardly, as a consequence of which the catch 52 disengages part 38, which in turn is pulled downwardly by the spring 49. During this motion, the part 38 strikes on a pin 45, by means of the catch-shaped butt-end 41, whereby the type wheel 10 strikes against the platen 56. In the last moment before the type wheel strikes the platen, the catch 41 disengages itself by striking against the pin 44. After the type wheel has reached the platen and the printing has been effected the part 38 with its nose 40 comes into contact with a pin 46 above the revolving point of the axis of the type wheel, pushes it backwards, whereby the shaft 47 rotates backwards, and returns the axis of the type wheel, to its rest position. The same process takes place when the other keys are struck.

Figure 3:
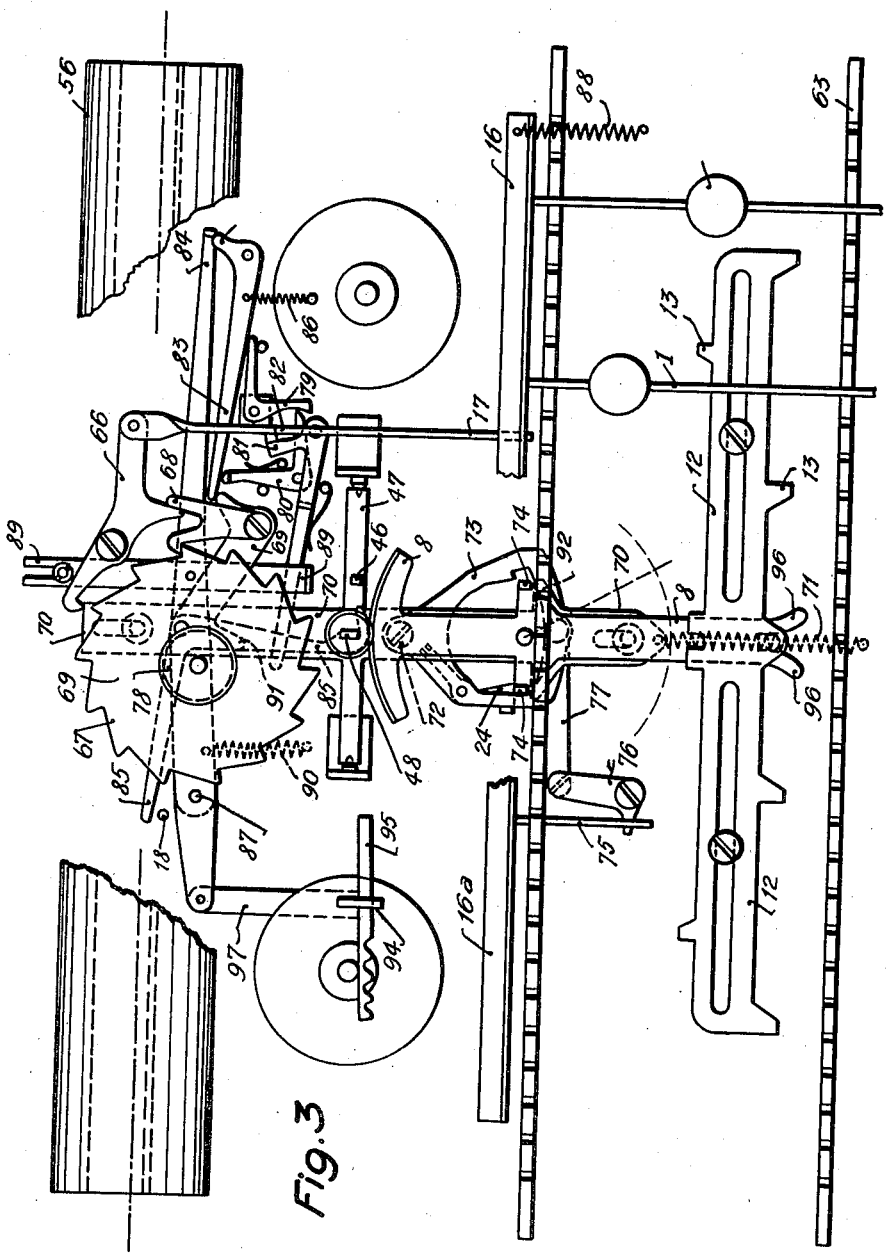
Figure 3 is a fragmentary top plan view of another form of type wheel typewriter construction.

Another form of construction of the invented typewriter is shown in Figs. 3 and 3a. When a key is struck, the key pin 1, as described, moves rearwardly, wherefore the guides 63 of the bearing rods are provided with little rollers, so as to facilitate the movement of the keys. The right hand tilting device 16 is provided on its rear end with a bridge 64. This bridge bears in front of the blade 65 against the key pin struck. The bridge 64 bears behind the blade 65 against the key pins remaining at rest whereby the neutral keys are arrested until the key pin struck has returned to its initial position. During the forward movement of the tilting device 16 the connecting rod 17 is also pushed forwardly whereby the part 66 rotates and with its upper tooth engages in one of the teeth of the ratchet wheel 67. At the same time, part 66 pushes the catch 68 off the ratchet wheel, whereby the part 69, to which the catch is attached, drops and releases the small board 70 which is brought under tension by the spring 71. The part 73 is at 72 pivotally connected to the small board 70. The part 72 is hollowed out in the centre, and its right hand and left hand parts show cut-outs. In one of these cut-outs, when in rest position, one of the pins 74 is stationed, which pins are attached to the segment 8. The small board 70, on dropping, is accompanied by the part 73, which strikes against a pin 74, thereby causing the segment 8 to revolve. On striking against the left-hand tilting device 16a, the part 73 reverses its motion, moving leftwards while the part 75 causes the part 76 to rotate, and displaces the part 73 towards the left by means of a connecting element 77. This reversal causes the right hand pin 74 to be struck and in this way the segment 8 revolves towards the right. The pinion 78, mounted on the axle of the ratchet wheel 67, engages with its teeth in the rack of the carriage.

When the tilting device 16 and the part 17 are pushed forwardly the catch 79 is carried along forwardly and moves to a point slightly beyond the catch 80. The catch 81 simultaneously snaps into the slot 82 of the part 17. The catch 83 supports the part 83 which in turn maintains the part 84. The catch 85, an attachment to the part 84, acts with its toggle on the lower part of the axis of the type wheel 48. During the return movement of the key pin 1, and of the part 17, the catch 79 strikes against catch 80. The latter rotates, releasing the arm 83 which rotates owing to the action of the spring 86 and simultaneously disengages the arm 84. The parts 84 and 69 are both supported at 87.

The released part 84 is pulled downwardly by means of spring 90, and with the catch 85 mounted on it strikes against the axis 48 of the type wheel, below the point of rotation. The type wheel 10 strikes against the platen 56 until it is brought back to rest position by the butt end 89, which is also mounted on part 84 and which strikes against the axis of the type wheel above the point of rotation or against the pin 46, above the shaft 47. The effecting of the stroke and return of the type wheel is effected in this form of construction, by one and the same spring 90, on the same principle as illustrated in the first form of construction. The returning part 17, having been stopped by the catch 81 in its return motion, after the disengagement of the catch 80 was effected, remains stationary until the dropping arm 84 in the last moment, after the type wheel has effected its stroke, with its butt end 91 rotates the catch 81 as a result of which the rod 17 is disengaged, and the part 66, by the spring of the tilting device 16, is withdrawn from the tooth of the ratchet wheel 67, whereby the pinion 78 is simultaneously disengaged and is rotated by the rack of the carriage until the catch 68, which has dropped on a tooth, is returned to its rest position and also brings the arm 69, as well, back to its initial position, the initial position being limited in an upward direction by a stop.

Simultaneously an engaging pin on arm 69 returns the arm 84 to its rest position. The part 83 too, is brought back to its initial position by arm 69. The arm 69 on its return motion also brings the small board 70 back to its initial position, and the butt surfaces 92 of the small board 70 on their part strike against the pins 74 of the segment 8, and bring it back to its initial position whereby the type wheel is also brought back to its initial position. The part 93, being an attachment to the arm 89, engages in pinion 94, whereby the axis 95, which is provided with feed screws, sets the ink ribbon into motion. In Figure 3 the segment 8 is provided at its extremity with fork-shaped ends 96. The rounded off portions of these ends are to meet the requirements in the rotations of the segment, which must rotate through the same angle, from letter to letter.

The forms of construction of the typewriter hereinabove described are provided with push keys in accordance with the drawings. These push-keys retain their rest position by means of spring-arms 97 of a common spring-surface 98, and are brought back to their initial position after the keys are struck. However, the push keys are merely supposed to afford a simplified construction of the machine. The typewriter may also be driven by normal balancing keys, the levers of which are pivoted on an axis, and which in known manner, when the key is pressed down, by means of push pins push forwardly the tilting devices 16. In this case the push pins of the balancing keys as in the constructions described above are provided with butt-ends pointing downwards, against which, as described, the teeth of the selecting cam 12, Fig. 1, are intended to strike.

Figure 4:
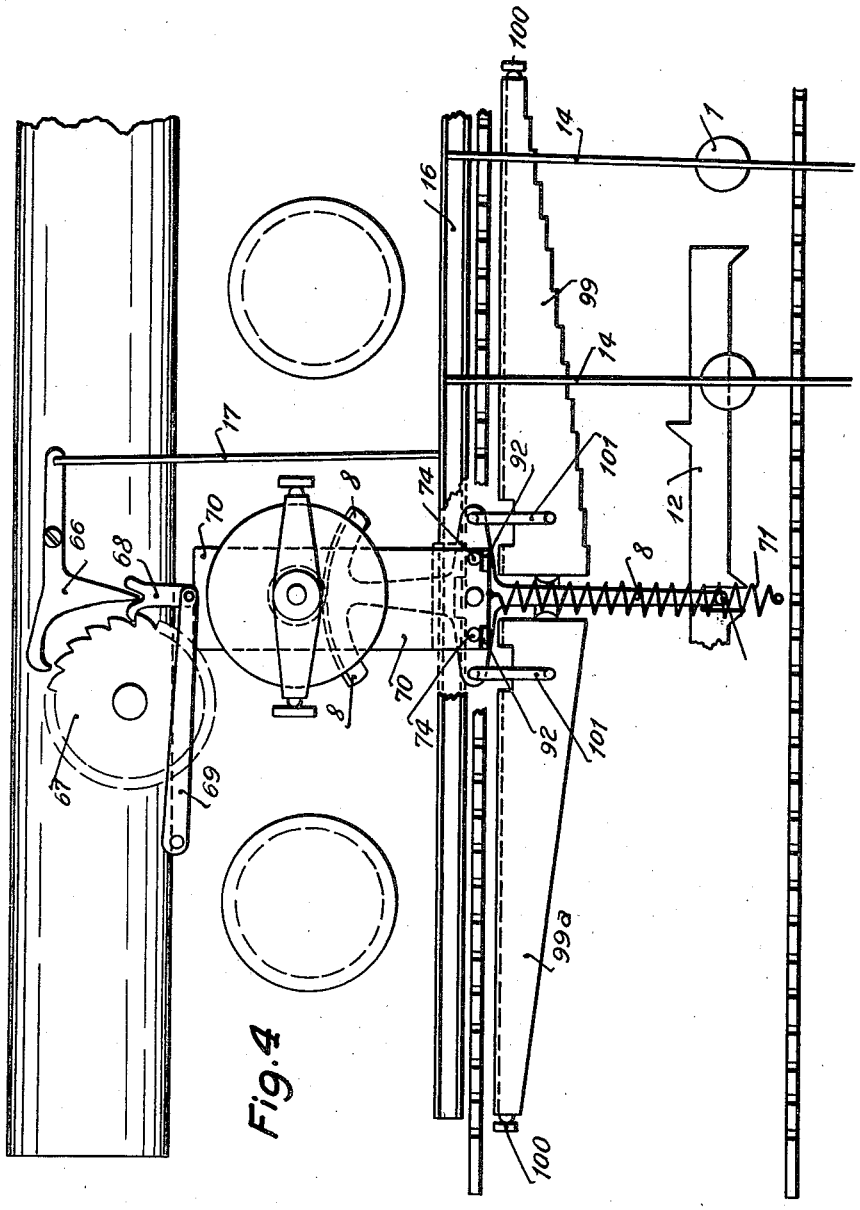
Figure 4 is a fragmentary top plan view of another form of type wheel typewriter construction.

Apart from the forms of construction described above, the typewriter according to this invention, which aims at an automatically driven typewheel, may also have forms of construction differing from the preceding ones, according to which the working is in part only effected automatically. According to the form of invention shown in Fig. 4, the type wheel is adjusted to a certain letter by pressing downwardly or pushing forwardly a key by hand. On the other hand the return of the type-wheel to its initial position, after the printing stroke has been performed, is effected by the spring of the carriage. When a key 1 is pressed down, the machine part 99 which is pivotally mounted at 100, rotates in a circular way, the key pins with their arms 14 striking against the bevelled, or sloping edge of the part 99. The bevelled portion of the part 99 has for its purpose the settlement of the movement of the keys during different rotations of the type wheel. This rotation causes the segment 8 to revolve by means of the connecting parts 101 alternatively rightwardly and leftwardly, according to whether we have struck with the right hand keys the part 99 or with the left hand keys the part 99a. Before the keys strike with their butt ends 14 against the part 99, or 99a respectively, the part 16 causes the displacement of the part 17 and causes part 66 to rotate, as described in connection with the preceding construction, Fig. 3, and part 66, as described, engages with its butt-end in one of the teeth of the ratchet wheel 67, and lifts the catch 68 off the ratchet-wheel 67 whereby catch 68 drops down on to the next lower tooth of the ratchet wheel and releases the arm 69, which latter, as shown in Fig. 3, simultaneously disengages the small board 70, which is pulled downwardly by the spring 71. Only now the road is cleared for the rotation of the segment 8, and in this way also for the type wheel. As shown in Fig. 4, the segment 8 is rotated by hand, until the selecting comb 12 strikes against one of the key pins which have been struck from time to time. During the return movement of the key, the stroke and return of the type-wheel is performed as illustrated in Fig. 3. Also the adjustment of the machine to its initial position takes place in the same manner as shown in Fig. 3. During the return upward movement of the small board 70, the angles 92 of the small board strike against the pins 74 and return the segment 8 to its initial position.

In the last form of construction we dealt with an automatic performing of the stroke of the type-wheel, and an automatic return adjustment (return rotation) of the type wheel inasmuch as the spring of the carriage effects the winding of the spring for the striking action of the typewheel, and returns the type-wheel to its original position, whereas the adjustment of the typewheel to the required letter is done by hand, whereby the spring 71 is not required to have any considerable strength and the spring of the carriage is considerably relieved.

The spring of the carriage may be relieved further still in a form of construction of the above typewriter, in which the carriage only effects the winding of the spring for the type-wheel to perform its stroke, whereas the adjustment of the type-wheel, as well as its return to the rest position, is effected by hand, inasmuch as the parts 99 and 99a are provided with springs which on striking a key are brought under tension by hand at the same time as the rotation of the segment 8 takes place. The releasing of the key causes the springs of the parts 99 and 99a to bring the segment 8 back to its rest position. In this case the small board 70 is no longer required. The mechanism, however, which brings about the stroke of the type-wheel and its return remains the same as shown in Fig. 3; i. e., the spring that effects the stroke of the type-wheel is brought under tension by the carriage, and released, as described, during the return movement of the key.

In the case last mentioned, there is also a possibility of entirely dispensing with the spring 90 of the arm 84, by linking the arm 84 to the part 17 in such a manner that a pin, attached to part 17, engages in a transverse slot, provided on the arm 84. In this case the type-wheel effects its stroke and return movement through the action of the spring 88, Fig. 3, of the tilting device 16, the winding of which is done every time a key is struck, and the release of which takes place simultaneously with the releasing of the key, so that the spring, that causes the keys to come back, simultaneously causes the type-wheel to perform its stroke and resume its original position.

The same effect can be obtained when the spring 88 of the tilting device 16 is altogether omitted and the spring 90 of the arm 84 remains in use. The arm 84 will then automatically repel the part 17 and the tilting device 16, as a result of which the key-pins are returned to their original position.

Figure 5 shows a type of construction according to which the type-wheel selects its positions, with respect to the strokes it performs, in conjunction with the rotations of tubular shafts 99, inasmuch as the type-wheel keeps revolving until one of the graduated sections that run along the selecting edge of the shafts strikes against the intervening key, the rotation of the shafts taking place either as described in the previous instances, or by releasing a spring, the winding and rewinding of which is done by the carriage, or again, by causing the key-pins 1 to strike directly with their noses 14, against the lower edge of the shaft, until the upper edge is brought to strike with one of its graduated sections against the intervening key-pin in Fig. 6a. The type of construction, as shown in Figs. 5 and 5a, may be effected, moreover, by using, instead of two sectional tubular shafts, each corresponding to the right-hand side, and the left-hand side of the machine, respectively, two shafts running all the way through, from right to left, and mounted in a manner shown in Figures 6 and 6a, so that the segment 8 works, rightward, with one of the shafts, while from the left it works with the other one, by means of a rod, and so as to get one of the shafts to rotate backward, the moment the other one, butting, reaches with one of the graduated sections of its edge the key that was pressed down, the backward rotation going on till that moment, the two shafts are mounted, eventually, one underneath the other. The butting-surfaces on the sectionally graduated edge of the selecting-tubes afford regularity as to the sliding motion of the keys.

As to the striking-motion of the type-wheel, its impulse may be secured, as shown by the previously described types of construction, by means of a spring, the winding of which is done by the carriage, or else in direct conjunction with the pressing down of the keys, as shown by the side-projection in Fig. 5.

Figures 6 and 6a show another type of the construction, as described. This type of construction provides, in addition to both tilting-devices 99, on the right-hand, and left-hand side of the machine, a third oscillating-device, running all the way through from the right to the left, and working as a ratchet-contrivance, being equipped both ways, from the right and from the left, with a slanting, and sectionally graduated edge. That third tilting-device 102 is connected with the segment 8, by means of the arms 103, which encompass the pins 104. Segment 8, the moment one of the tilting-devices 99 is brought to intervene, causes the tilting-device 102 to move too. The segment is pivoted at 105. Part 103 engages part 102 in 106, somewhere below its centre of rotation, thereby causing the slanting edge 102 to strike against the key-pin, and to stop the rotation of the segment 8. Owing to the fact, that the pins 104 are mounted farther away from the revolving-centre 105 of the segment 8, the run of the arms 103 is longer than the run of the arms 101, thereby affording a possibility of providing the tilting-device 102 with deeper sectional recesses than those shown in Figures 5 and 5a, and allowing, if necessary, greater margins with respect to every rotation of the type-wheel. The working-impulse with which to operate the selecting contrivance (tilting-device), as described, 99 and 102, may be secured by automatic means, in accordance with the previously described types of construction, or else by getting the key-pins 1 to strike against the slanting edge of the tilting-device 99, by means of their noses.

Figure 7 shows a type of construction, in compliance with this invention, the particularity of which lies in the fact, that the keys, instead of being push-keys, are of the balancing-type. The innovation in this respect lies with the key-pins, which, although mounted on one axis, common to all of them, and their lengths being different, always effect one and the same motion, on descending. This can be managed by providing the key-pins with butting-legs of various lengths and shapes 131, 132 and 133. Longer key-pins have longer butting-legs, and shorter key-pins have shorter ones. The keys cause their respective butting-legs to strike against the tilting-device 16, which is pivoted at 134. Arm 17 forms an attachment to the tilting-device 16, and is bound to effect the same movement, throughout, when setting the machine to work. The longer keys strike against part 16 at a point which lies closer to the centre of rotation, whereas the shorter keys, correspondingly, strike against part 16, farther off from that centre. Thus key 1b will effect the same descending motion as key 1.

Figure 8 illustrates an improvement regarding this invention inasmuch as the whole working-process of the machine obeys direct compulsion, and does so, in a way that the type-wheel cannot possibly be brought to effect its stroke before the selecting cam 12 has caused the type-wheel to revolve to the point corresponding to the letter which is demanded. For this purpose, a second cam 12a, placed above cam 12 has been provided. Cam 12 carries a part 113, which is pivoted on the pin 112. Part 113 encompasses within its slot a pin 114, which is mounted in the upper cam 12a, as a result of which, the two cams 12 and 12a, on shifting respectively, cause part 113 to revolve, striking with its pulley against part 116, which, being mounted in part 117, and tilting, is brought to move back. Part 117 is pivoted in 118, causing by its rotation the removal of arm 119, as a result of which the catch 120 rotates, thereby disengaging part 83, and arm 84. The rest of the working-process takes place as described heretofore. This improvement affords absolute protection against the possibility of the type-wheel being brought to effect its stroke before having revolved to the selective position corresponding to the letter that is demanded.

Figure 9:
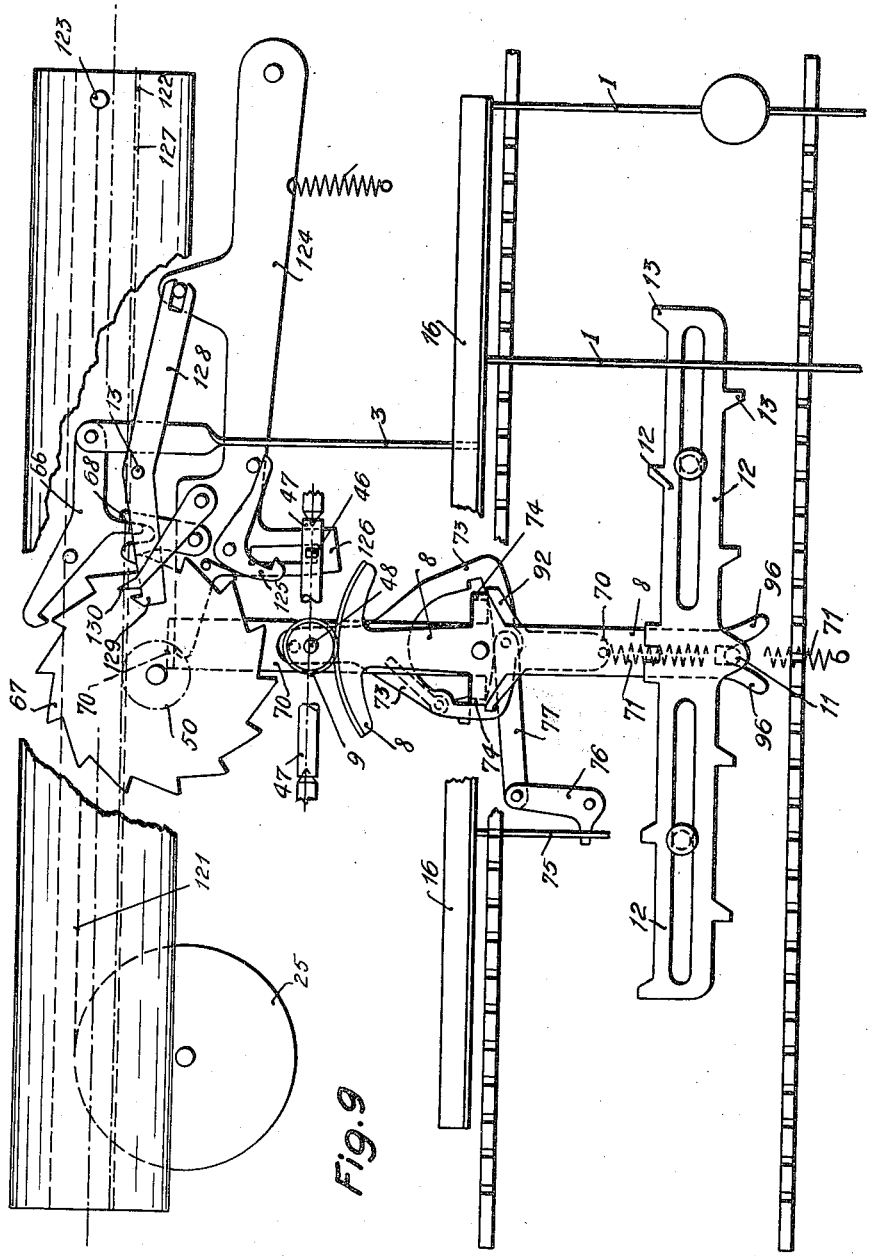
Figure 9 is a fragmentary plan view of another form of construction wherein the carriage and type wheel are operated in the absence of springs.

Figures 9 and 9a show a type of construction in accordance with this invention, providing for the carriage to cause with its motion, directly, without the intermediary of any spring, the type-wheel to effect its stroke, or else, using a spring, the type-wheel to be brought to its original position by the motion of the carriage. This innovation is possible, owing to a contrivance by which the spring of the carriage, on being released, will not cause the carriage to move at once, so that its first release either causes the type-wheel to effect its stroke, and to move back, or to bring the type-wheel back after it has effected its stroke. A further releasing of the spring sets the carriage into motion. Figures 9 and 9a show an example of this type of construction with regard to the above invention. The moment a key 1 is pressed down, the type-wheel, as described before, is brought to revolve to its selective point in conjunction with the corresponding key. The return of the key causes part 66 to rotate, and the ratchet-wheel to be disengaged. The spring of the carriage, by means of a cord 121, is connected to a movable rack 122, at 123. The rack is mounted, flexibly, on the carriage, and meshes with pinion 50. The release of the spring of the carriage 25 causes a cord 121 to displace the movable rack 122, thus causing pinion 50 and the ratchet-wheel 67 to revolve. Catch 68 is raised by means of the ratchet-wheel, and carries with it part 124, which, by means of catch 125, secures the striking-motion and return of the type wheel, inasmuch as catch 125, as a result of arm 124 dropping, either strikes against the axis 48 of the type-wheel, or involves pin 46, on the upper part of the shaft 47, catch 125, as shown above, disengaging itself just before the type-wheel effects its stroke, whereas part 126 of arm 124 brings the axis of the type-wheel back to its rest-position. During this part of the process, the carriage, by means of a second rack 127, is checked by part 128, the nose 129 of which has been catching in the rack 127 and was stopped. Part 128, however, as part 124 keeps moving, releases the carriage which, in conjunction with the rack 127, by means of a catch 130, moves on.

Figure 10 shows a further development of the principles so far referred to, inasmuch as the control of the type-wheel may be secured as follows: the segment 8, the moment the pinion 9, mounted on the axis of the type-wheel 48, causes the rack 107 to be shifted to the right or to the left, as the case may be with regard to the location of the keys on the right-hand side, or left-hand side of the keyboard, causes the arms 108 to move, correspondingly to the right or to the left, as a result of which the pins 109 strike against the nose of the intervening key, thus getting the type-wheel to revolve to the selective position with regard to any definite letter. As to the arms 108, their normal positions may differ. The rod 107 in Figure 10a is mounted to move directly with the segment when moving rightward, or leftward, alternatively. Figure 10b illustrates a further example as to the various types of construction. It provides two arms, each, from the right and from the left, of the kind 108 referred to, their respective runs thereby being reduced, as well as the impact, the normal position of those two pairs of arms 108 being conditioned by the distance between the keys, with respect to one another, inasmuch as the first arm is located at that same distance from the key it is supposed to work with first, whereas the pin 109 on the second arm is at half that distance from the key it is to be in touch with first. Figure 10c shows a type of construction that provides three arms, one in the centre, and the other ones working from the right and the left, respectively. All the types of construction may provide direct working-impulse from the pinion 9, or from the segment 8, as regards the rack 1.

I claim:

1. In a typewriter, a type wheel, a board of keys which are operatively connected to the type wheel, a carriage, a spring operatively connected to the type wheel for tilting it, means connected to the carriage for putting the spring under tension, and means operatively connected to the keys for relieving the spring of its tension and allowing it to tilt the type wheel.

2. In a typewriter, a type wheel, a board of keys which are operatively connected to the type wheel, a spring operatively connected to the type wheel for tilting it, manually operated means for putting the spring under tension, and means operatively connected to the keys for relieving the spring of its tension upon the return movement of the corresponding key and allowing it to tilt the type wheel.

3. In a typewriter, a type wheel, a board of keys which are operatively connected to the type wheel, a carriage, a spring operatively connected to the type wheel for returning it to its original position, means connected with the carriage to place the spring under tension for all letters and signs of an entire line, means operatively connected to the keys for partially relieving the tension of said spring as each key is pressed and allowing it to return the type wheel to its original position.

4. A typewriter as set forth in claim 3, characterized by the provision of means for the striking of the type wheel during the rearward movement of the keys.

5. In a typewriter, a type wheel, a board of keys which are operatively connected to the type wheel, a carriage, a spring operatively connected to the type wheel for tilting it, means connected to the carriage for putting the spring under tension, and means operatively connected to the keys for relieving the spring of its tension and allowing it to tilt the type wheel, a rack operatively connected with the type wheel and having teeth less in number than the key bars against which they abut, means operatively connected to the keys to displace said rack (12, Fig. 1) in a lateral direction until a tooth (13, Fig. 1) strikes against a key bar and the type wheel is adjusted to the required letter or sign.

SEBASTIAN LOEWENBUCK.